(12) United States Patent
Powell (10) Patent No.: US 9,995,358 B2
(45) Date of Patent: Jun. 12, 2018

(54) DUAL DUROMETER FLEXIBLE JOINT FOR A SUSPENSION LINK

(71) Applicant: Douglas H. Powell, El Dorado Hills, CA (US)

(72) Inventor: Douglas H. Powell, El Dorado Hills, CA (US)

( * ) Notice: Subject to any disclaimer, the term of this patent is extended or adjusted under 35 U.S.C. 154(b) by 33 days.

(21) Appl. No.: 15/016,060

(22) Filed: Feb. 4, 2016

(65) Prior Publication Data

US 2017/0225530 A1 Aug. 10, 2017

(51) Int. Cl.
*F16F 1/38* (2006.01)
*B60G 7/00* (2006.01)

(52) U.S. Cl.
CPC ............... *F16F 1/38* (2013.01); *B60G 7/003* (2013.01); *B60G 2204/41* (2013.01); *B60G 2204/4102* (2013.01); *B60G 2204/416* (2013.01); *B60G 2206/1112* (2013.01); *B60G 2206/73* (2013.01)

(58) Field of Classification Search
CPC .......................... B60G 7/001; B60G 2204/14; B60G 2204/41; B60G 2206/10; F16F 1/38
See application file for complete search history.

(56) References Cited

U.S. PATENT DOCUMENTS

| | | | |
|---|---|---|---|
| 3,030,132 A | 4/1962 | Bernard | |
| 4,235,558 A | 11/1980 | Snyder et al. | |
| 4,420,274 A * | 12/1983 | Husch | F16F 1/393 403/227 |
| 4,671,694 A | 6/1987 | Brenner et al. | |
| 5,031,545 A | 7/1991 | Bourgeot | |
| 5,058,867 A | 10/1991 | Hadano et al. | |
| 6,854,917 B2 | 2/2005 | Kraine et al. | |
| 7,185,556 B2 * | 3/2007 | Beattie | B60G 7/003 29/516 |
| 7,306,393 B2 | 12/2007 | Erdogan | |
| 8,714,571 B2 * | 5/2014 | Nataraj | B60G 7/001 280/124.107 |
| 2013/0199332 A1 * | 8/2013 | Powell | F16C 11/083 74/579 R |

FOREIGN PATENT DOCUMENTS

FR 2691767 12/1993

* cited by examiner

*Primary Examiner* — Faye M Fleming
(74) *Attorney, Agent, or Firm* — Dodd Call Black, PLLC; Dustin L. Call (57) ABSTRACT

A flexible joint for attachment to a suspension link. The flexible joint includes a housing. The housing includes an external surface and an internal surface. The flexible joint also includes a flexible joint insert. The flexible joint insert includes an inner sleeve. The inner sleeve includes a channel, where the channel is configured to receive at least a portion of an external device, and an external surface. The flexible joint insert also includes an inner elastomer. The inner elastomer is fused to at least a portion of the external surface of the inner sleeve. The flexible joint insert further includes an outer elastomer. The outer elastomer is harder than the inner elastomer. An interface between the inner elastomer and the outer elastomer is fused and a portion of the outer elastomer is in contact with the internal surface of the housing. The outer elastomer is not permanently attached to the housing.

21 Claims, 12 Drawing Sheets

DUAL DUROMETER FLEXIBLE JOINT FOR A SUSPENSION LINK

CROSS-REFERENCE TO RELATED APPLICATIONS

Not applicable.

BACKGROUND OF THE INVENTION

Suspension links are a primary component of a vehicle suspension. For example, they can hold the axle of the vehicle in the proper position and prevent the axle housing from spinning when torque is applied to the axle. The connection of the suspension link to the vehicle frame and axle can help provide a proper "feel" in the ride of the vehicle, as the connection affects what motion is felt by the vehicle passengers. In addition, the correct operation, mounting geometry and end connection of the suspension link improves the performance of the vehicle over differing terrains and speeds.

However, there are a number of drawbacks in current joints which connect the suspension link to the vehicle frame. In particular, the orientation and position of the axle relative to the frame can be changing while the vehicle is being driven. While the changes may be minimal, the movement may, over time, cause wear within the joint. Wear in the joints can cause vehicle performance degradation, noisy or squeaky joints, vehicle vibration, a poor ride quality and steering challenges In addition, debris can enter the joint over time. This debris acts as an abrasive agent within the joint. I.e., over time, the movement of the debris relative to the parts of the joint increases the rate at which wear occurs within the joint. This leads to the inclusion of more debris and to more space in which debris can be trapped, further increasing the wear rate of the joint.

This wear can be removed by flexibly fusing the articulating parts of the joint to one another. Flexibly fusing the articulating components stops movement of the parts relative to one another and can help prevent debris from entering the joint. However, doing so results in an excessive amount of stress on the flexible materials associated with the fusing and reduces the amount of rotation that can be absorbed by the joint. I.e., it becomes more likely that changes in the orientation or position of the suspension link relative to the frame will break down and/or damage the elastomeric properties of the flexible portions of the joint, likely resulting in joint failure.

Accordingly, there is a need in the art for a joint which can resist wear at the appropriate locations. In addition, there is a need in the art for a joint which can resist the accumulation of debris and articulating wear. Further, there is a need in the art for a joint which can allow normal changes in position and orientation of the suspension link relative to the frame without damage to elastomeric properties of the flexible components.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a flexible joint for attachment to a suspension link. The flexible joint includes a housing. The housing includes an external surface and an internal surface. The flexible joint also includes a flexible joint insert. The flexible joint insert includes an inner sleeve. The inner sleeve includes a channel, where the channel is configured to receive at least a portion of an external device, and an external surface. The flexible joint insert also includes an inner elastomer. The inner elastomer is fused to at least a portion of the external surface of the inner sleeve. The flexible joint insert further includes an outer elastomer. The outer elastomer is harder than the inner elastomer. An interface between the inner elastomer and the outer elastomer is fused and a portion of the outer elastomer is in contact with the internal surface of the housing. The outer elastomer is not permanently attached to the housing.

Another example embodiment includes a suspension link. The suspension link includes a body. The suspension link also includes a flexible joint. The flexible joint includes a housing. The housing includes an external surface, an internal surface and an opening. The flexible joint also includes an attachment. The attachment is connected to the external surface of the housing and is configured to affix the flexible joint to the body. The suspension link also includes a flexible joint insert. The flexible joint insert is configured to be inserted in the housing. The flexible joint insert includes an inner sleeve. The inner sleeve includes a channel, where the channel is configured to receive at least a portion of an external device, and an external surface, where at least a portion of the external surface of the inner sleeve is convex. The flexible joint insert also includes an inner elastomer. At least a portion of the inner elastomer is concave. The concave portion of the inner elastomer is permanently attached to the convex portion of the external surface of the inner sleeve. The flexible joint insert further includes an outer elastomer. The outer elastomer is harder than the inner elastomer. An interface between the inner elastomer and the outer elastomer is fused and a portion of the outer elastomer is in contact with the internal surface of the housing. The outer elastomer is not permanently attached to the housing.

Another example embodiment includes a suspension link. The suspension link includes a body. The suspension link also includes a flexible joint. The flexible joint includes a housing. The housing includes an external surface and an internal surface. The suspension link also includes a flexible joint insert. The flexible joint insert is configured to be inserted in the housing. The flexible joint insert includes an inner sleeve. The inner sleeve includes a channel, where the channel is configured to receive at least a portion of an external device, and an external surface, where at least a portion of the external surface of the inner sleeve is convex. The flexible joint insert also includes an inner elastomer. At least a portion of the inner elastomer is concave. The concave portion of the inner elastomer is permanently attached to the convex portion of the external surface of the inner sleeve. The flexible joint insert further includes an outer elastomer. The outer elastomer is harder than the inner elastomer. An interface between the inner elastomer and the outer elastomer is fused and a portion of the outer elastomer is in contact with the internal surface of the housing. The outer elastomer is not permanently attached to the housing. The flexible joint insert further includes a retaining member, where the retaining member is configured to retain the flexible joint insert at the opening of the housing.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
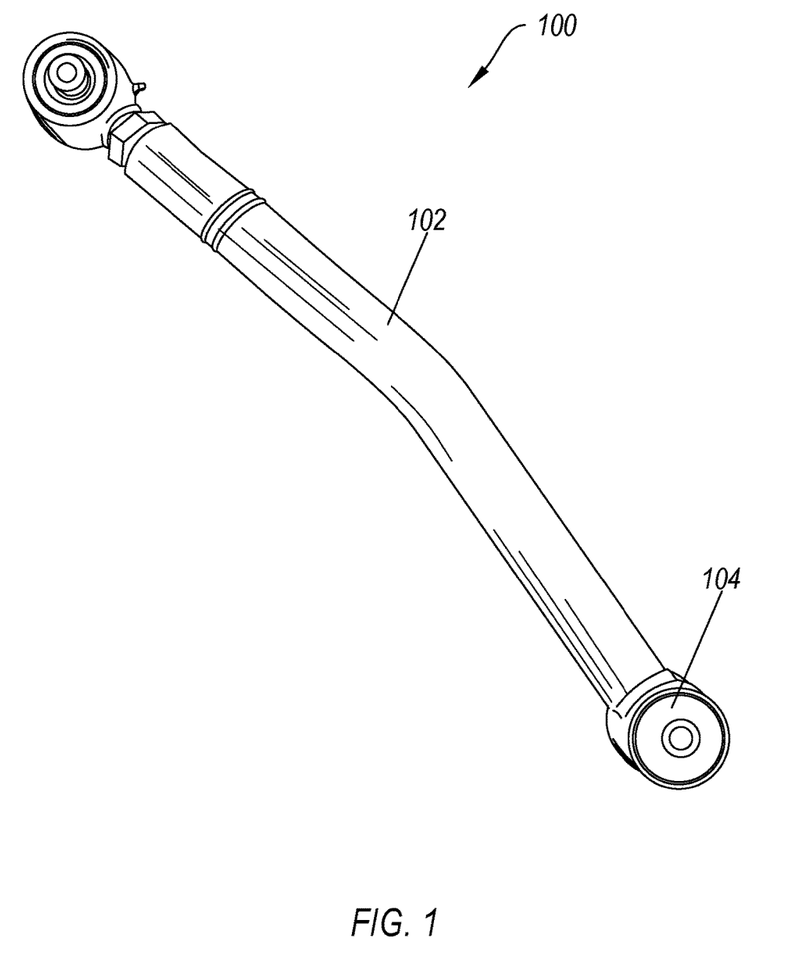
FIG. 1 illustrates an example of a suspension link.

FIG. 1 illustrates an example of a suspension link 100 used in a vehicle suspension. In at least one implementation, the suspension link 100 can include any device for connecting two parts of a vehicle to one another when the two parts may be changing position relative to one another, but the distance between the parts should remain constant. For example, the suspension link 100 can include a control arm, a track bar, a drag link or a tie rod. E.g., a set of suspension links 100 can be suspended between a vehicle axle and a vehicle frame in such a way as to prevent axial rotation of the axle housing while still allowing vertical articulation of the axle housing. I.e., a portion of the axle will tend to rotate under the torque created by the motor. However, if the housing of the axle is attached to the frame of the vehicle via properly configured suspension links 100 the torque of the motor will not rotate the axle housing.

FIG. 1 shows that the suspension link 100 can include a body 102. In at least one implementation, the body 102 is the main portion of the suspension link 100. For example, if the suspension link 100 is used in conjunction with a vehicle axle the body 102 can connect the vehicle frame with the axle. In particular, on each side of the axle, suspension links 100 can be placed opposite one another on the axles and connect the axle to the frame. The body 102 can include one or more bends, allowing the suspension link to connect the axle and the frame while avoiding other vehicle components.

FIG. 1 also shows that the suspension link 100 can include a joint 104. In at least one implementation, the joint 104 can be used to attach the suspension link 100 to an external device. For example, the joint 104 can be used to attach the suspension link 100 to a vehicle suspension or vehicle frame. In particular, the joint 104 can allow the axle and the frame to move relative to one another in a desired direction and prevent movement in an undesired direction. One of skill in the art will appreciate that the joint 104 can be attached to any desired external device and that a suspension and vehicle frame are an exemplary use, unless otherwise specified in the claims.

Figure 2A:
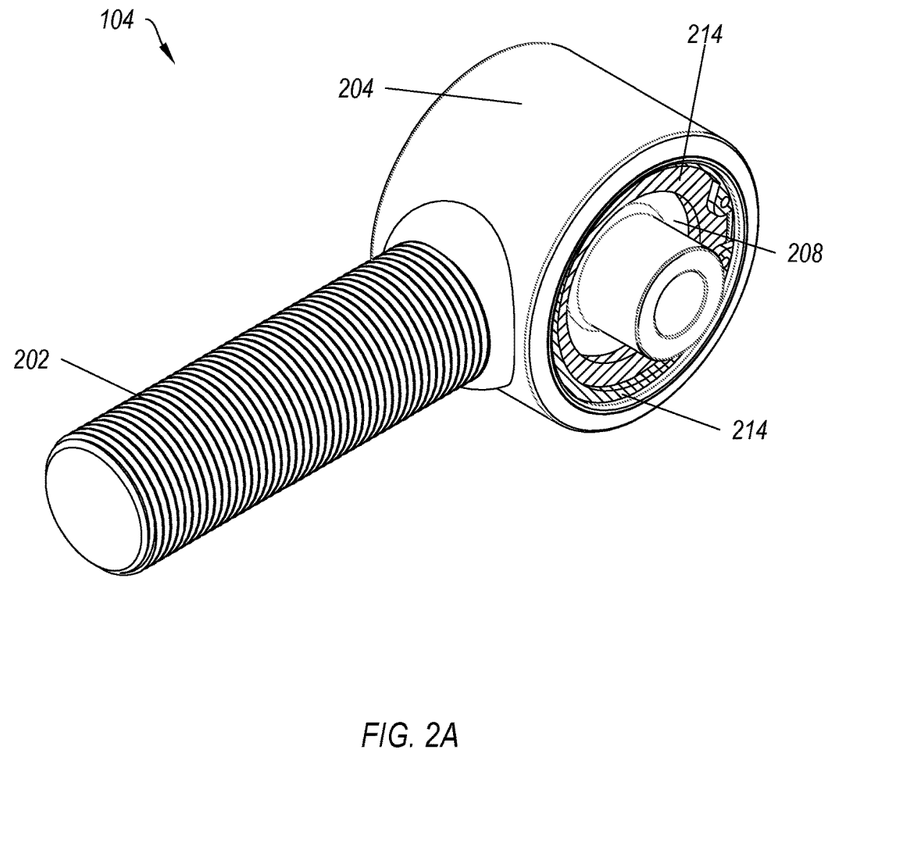
FIG. 2A illustrates a perspective view of a joint.
Figure 2B:
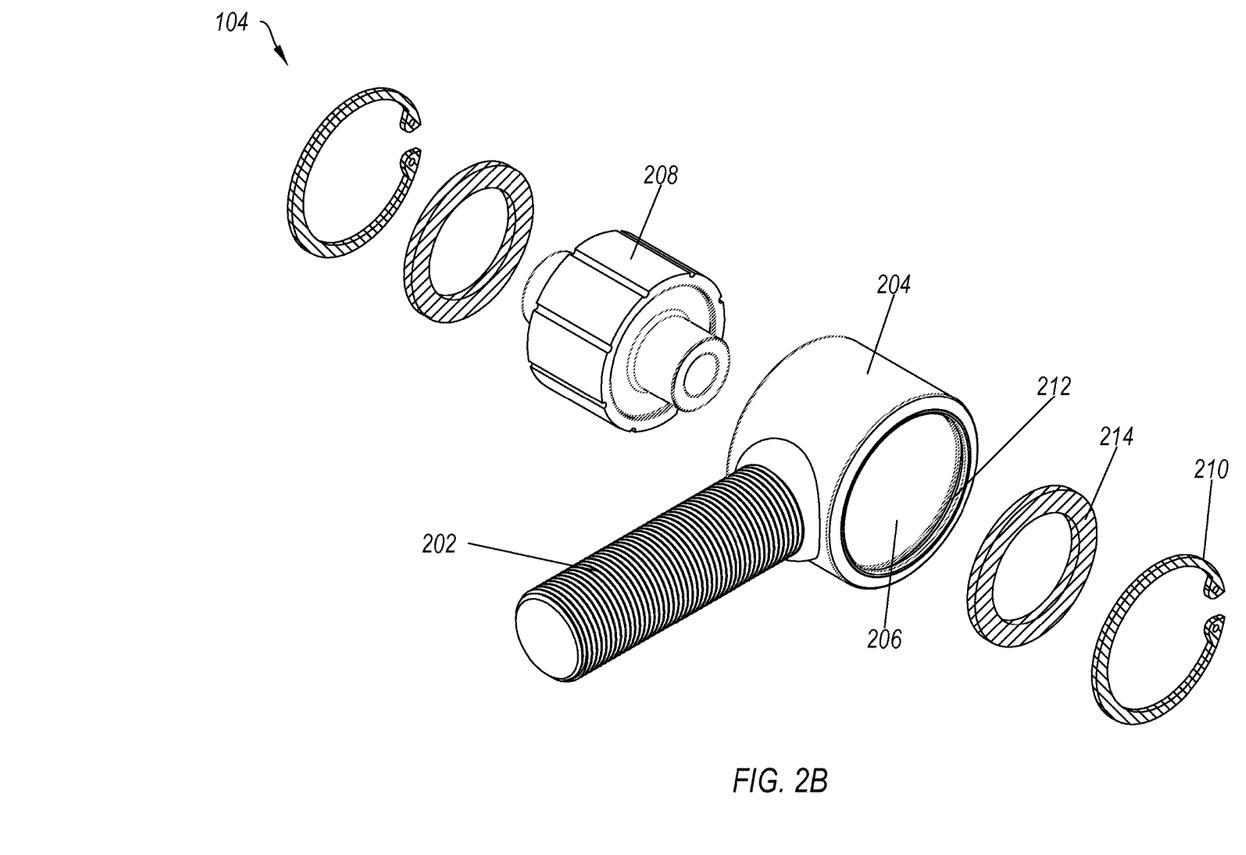
FIG. 2B illustrates an exploded view of the joint.
Figure 2C:
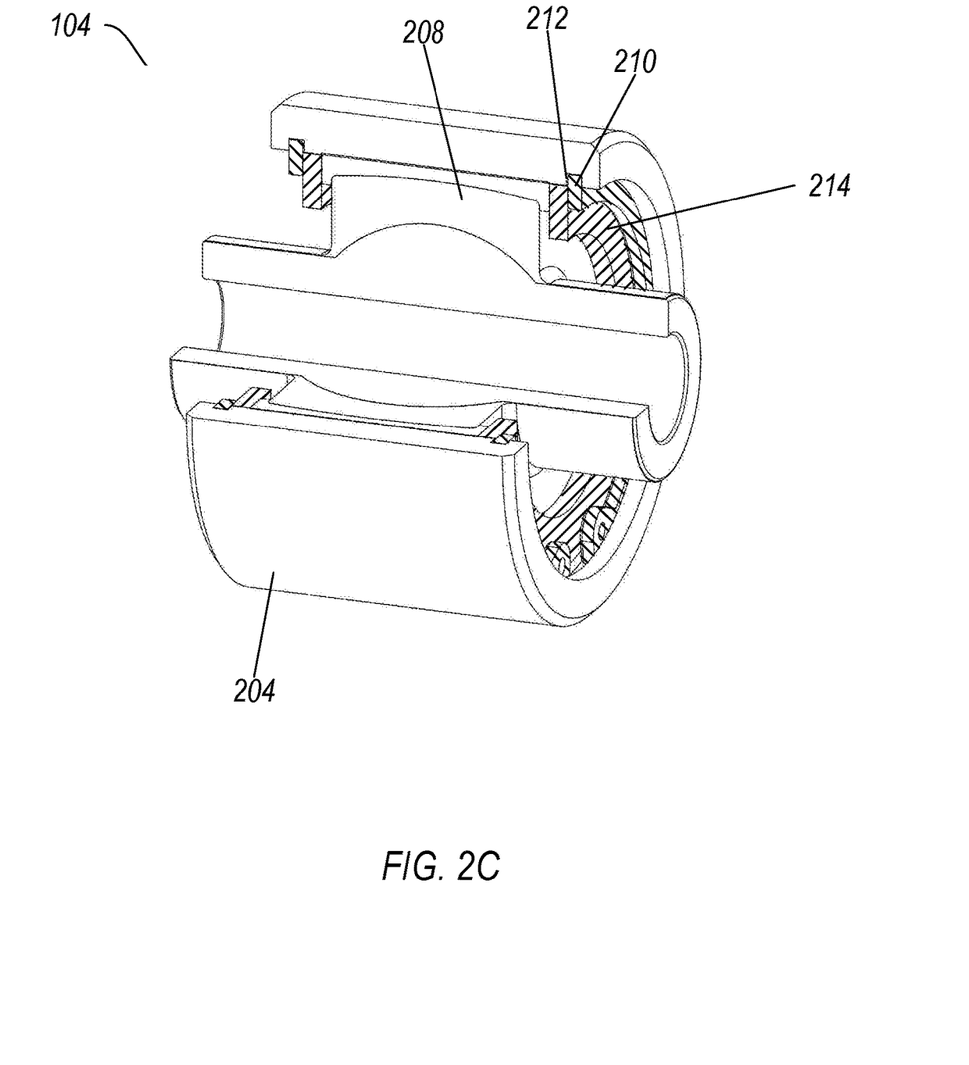
FIG. 2C illustrates a cross-section of the joint.

FIGS. 2A, 2B and 2C (collectively "FIG. 2") illustrate an example of a joint 104. FIG. 2A illustrates a perspective view of the joint 104; FIG. 2B illustrates an exploded view of the joint 104; and FIG. 2C illustrates a cross-section of the joint 104. In at least one implementation, the joint 104 can allow some rotation in the joint 104 without sustaining damage. In particular, the joint 104 eliminates excessive wear during normal use. Additionally or alternatively, the joint 104 can be secured against debris which can cause frictional wear inside the joint 104, as described below.

FIG. 2 shows that the joint 104 can include an attachment 202. In at least one implementation, the attachment 202 can connect the joint 104 to a suspension link. One of skill in the art will appreciate that a suspension link as used herein is exemplary and that the joint 104 can be used with any device, unless otherwise specified in the claims. The attachment 202 can included a threaded screw or any other desired attachment mechanism.

FIG. 2 also shows that the joint 104 can include a housing 204. In at least one implementation, the housing 204 can retain other portions of the joint 204. I.e., the housing 204 can ensure that the other parts of the joint 104 maintain a proper spatial relationship to one another. Additionally or alternatively, the housing 204 can protect the other portions of the joint 104. I.e., the housing 204 can prevent dust or other debris from damaging other portions of the joint 104, as described below.

FIG. 2 further shows that the housing can include a cavity 206. In at least one implementation, the cavity 206 can allow the joint 104 to connect to an external device, as described below. In particular, the cavity can include an open cylinder or hole which is configured to allow for a connection to an external device. The cavity 206 can include an axis or line formed by the centers of the bases of a cavity 206. The axis of the cavity 204 can be offset relative to the axis of the attachment 202. For example, the axis of the cavity 204 can be perpendicular to the axis of the attachment 202 or can form some other angle with the axis of the attachment 202. As used in the specification and the claims, the phrase "configured to" denotes an actual state of configuration that fundamentally ties recited elements to the physical characteristics of the recited structure. As a result, the phrase "configured to" reaches well beyond merely describing functional language or intended use since the phrase actively recites an actual state of configuration.

FIG. 2 additionally shows that the joint 104 can include an insert 208. In at least one implementation, the insert 208 can be placed within the cavity 206. The insert 208 can allow a connected external device to move relative to the axis of the housing 204, as described below. In particular, the insert 208 can allow the external device to rotate while remaining attached to the joint 104 and without damaging the joint 104.

FIG. 2 moreover shows that the joint 104 can include a retaining ring 210. In at least one implementation, the retaining ring 210 is configured to mate with a groove 212 in the housing 204. In particular, the retaining ring 210 secures the insert 208 within the housing 204 by ensuring that lateral force is transmitted to the housing 204 through the groove 212 rather than resulting in lateral movement of the insert 208.

FIG. 2 also shows that the joint 104 can include a washer 214. In at least one implementation, the washer 214 can distribute lateral force between the insert 208 and the retaining ring 210. I.e., force imparted to the washer 214 is spread throughout the immediate area, increasing the surface area on which any force is acting and, therefore, decreasing the pressure at a specific point in both the insert 208 and the retaining ring 210. Additionally or alternatively, the washer 214 can prevent debris from entering the joint 104. I.e., the washer 214 can prevent debris from entering the space between the insert 208 and the housing 204 by covering any openings along the mating between the insert 208 and the housing 204.

Figure 3A:
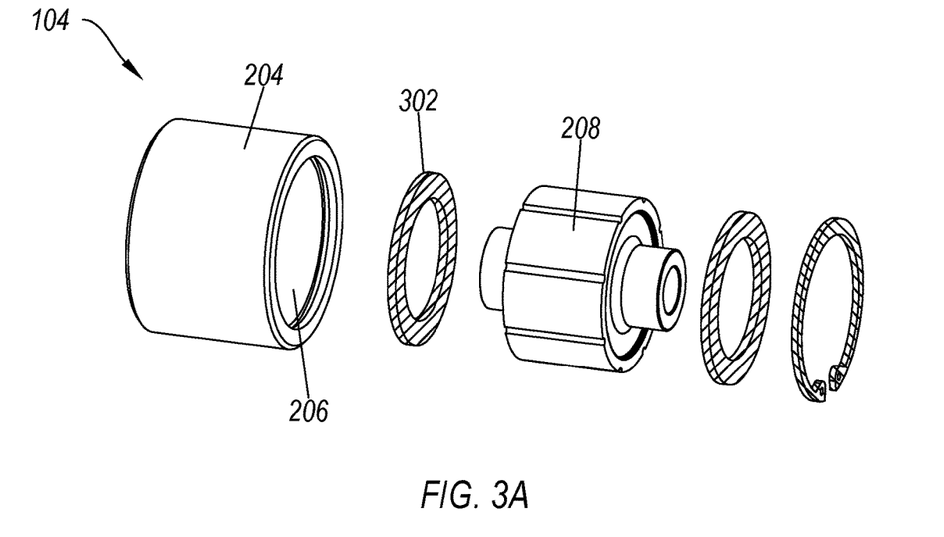
FIG. 3A illustrates an exploded view of a joint.
Figure 3B:
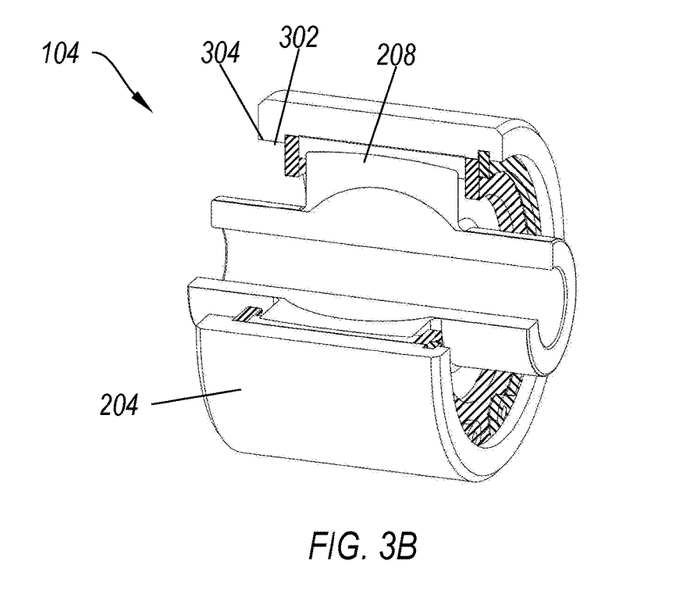
FIG. 3B illustrates a cross-section of the joint.

FIGS. 3A and 3B (collectively "FIG. 3") illustrates an alternative example of a joint 104. FIG. 3A illustrates an exploded view of the joint 104; and FIG. 3B illustrates a cross-section of the joint 104. In at least one implementation, the alternative example uses a different retaining member than the joint 104 of FIG. 2. I.e., the insert 208 is retained in a different manner within the housing 204 in a different manner. One of skill in the art will appreciate that the different retaining member can allow for customization of the joint 104 for any desired use.

FIG. 3 shows that the joint 104 can include a second washer 302. In at least one implementation, the second washer 302 can prevent the insert from exiting the housing 204 at one end of the cavity 206. In particular, the housing 204 can include a ridge 304 or flange. The ridge 304 can include a diameter which is smaller than the second washer 302. Thus, the ridge 304 prevents the second washer 302 from passing through the opening of the housing 204. I.e., the ridge 304 and second washer 302 perform the same function as one retaining ring 210 and groove 212 combination of FIG. 2 while still allowing the insert 208 to be inserted or removed from the cavity 206 as desired.

Figure 4A:
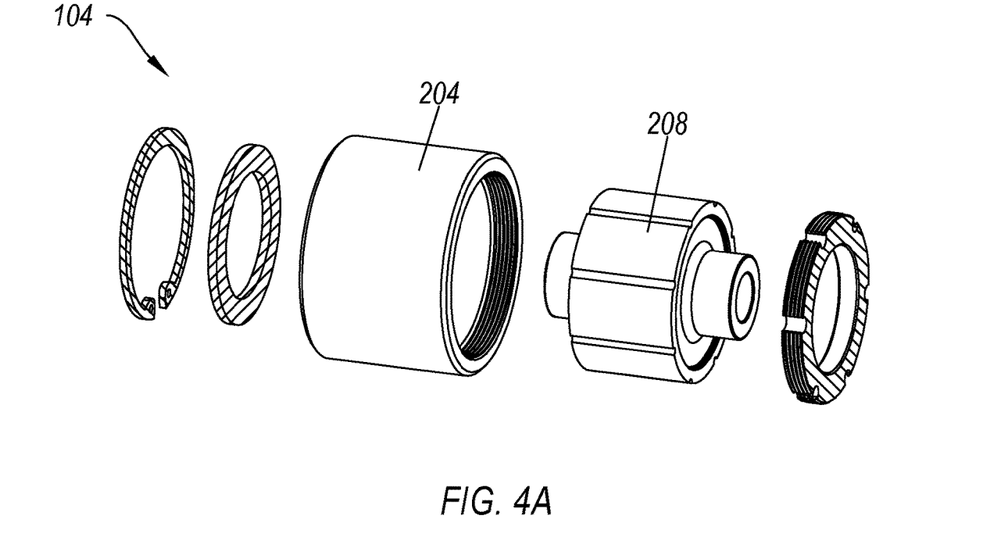
FIG. 4A illustrates an exploded view of a joint.
Figure 4B:
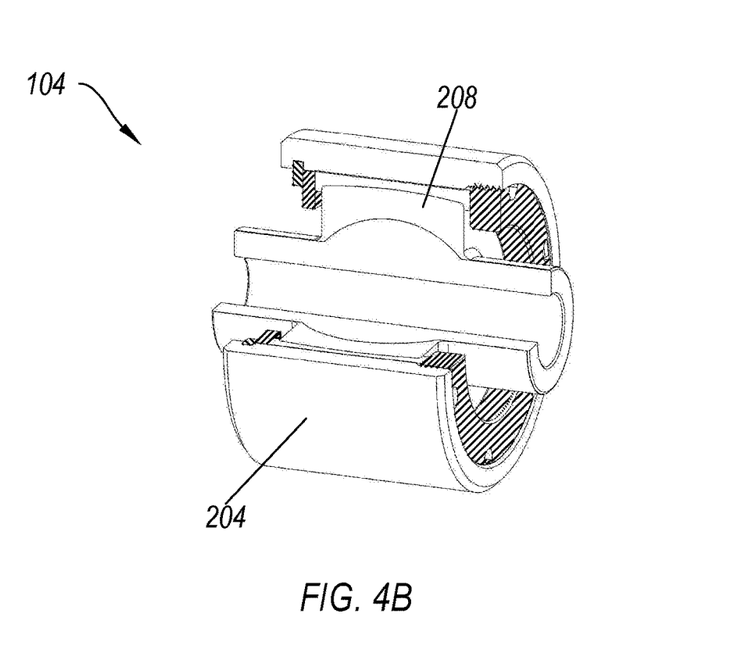
FIG. 4B illustrates a cross-section of the joint.

FIGS. 4A and 4B (collectively "FIG. 4") illustrates an alternative example of a joint 104. FIG. 4A illustrates an exploded view of the joint 104; and FIG. 4B illustrates a cross-section of the joint 104. In at least one implementation, the alternative example uses a different retaining member than the joint 104 of FIG. 2. I.e., the insert 208 is retained in a different manner within the housing 204 in a different manner. One of skill in the art will appreciate that the different retaining member can allow for customization of the joint 104 for any desired use.

FIG. 4 shows that the joint 104 can include a threaded washer 402. In at least one implementation, the threaded washer 402 can be threaded into the housing 204. I.e., the threaded washer 402 and the housing 204 can mate with one another using threads to prevent the insert 208 from exiting the housing at one end of the cavity 206. The threaded washer 402 performs the same function as a retaining ring 210 and groove 212 combination and the washer 214 of FIG. 2 while still allowing the insert 208 to be inserted or removed from the cavity as desired.

Figure 5A:
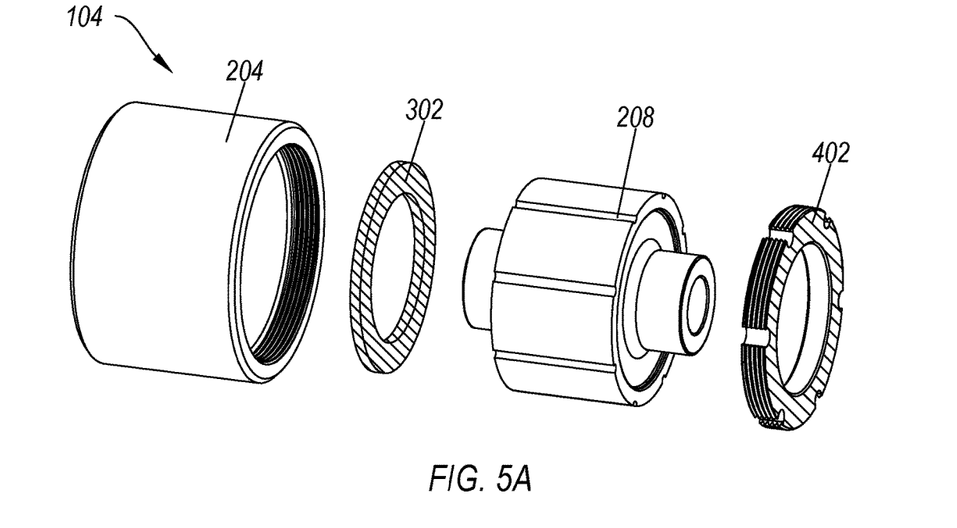
FIG. 5A illustrates an exploded view of a joint.
Figure 5B:
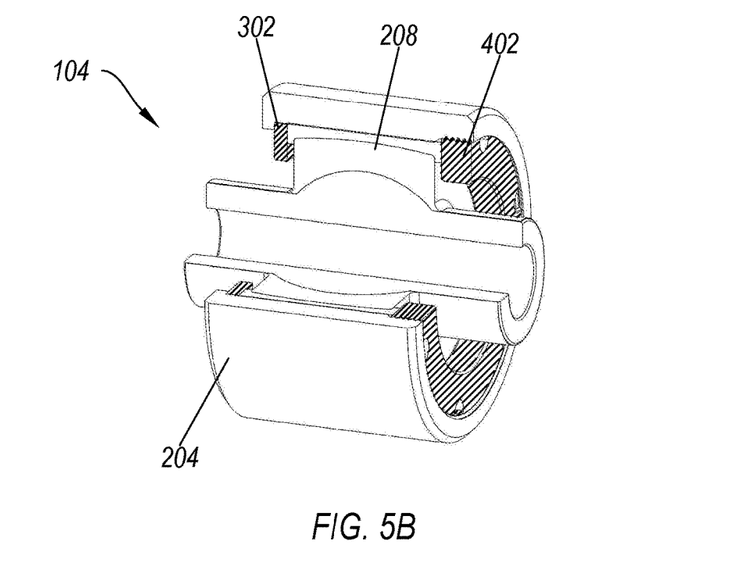
FIG. 5B illustrates a cross-section of the joint.

FIGS. 5A and 5B (collectively "FIG. 5") illustrates an alternative example of a joint 104. FIG. 5A illustrates an exploded view of the joint 104; and FIG. 5B illustrates a cross-section of the joint 104. In at least one implementation, the alternative example uses a different retaining member than the joint 104 of FIG. 2. I.e., the insert 208 is retained in a different manner within the housing 204 in a different manner. One of skill in the art will appreciate that the different retaining member can allow for customization of the joint 104 for any desired use.

FIG. 5 shows that the joint 104 can include a second washer 302 as in FIG. 3. FIG. 5 also shows that the joint can include a threaded washer 402 as in FIG. 4. One of skill in the art will appreciate that the retaining member can include any combination of elements which allows the insert 208 to be removed from the cavity 206 as desired and allows the insert 208 to be retained in the cavity 206 as desired. I.e., the retaining member can include any elements that allow the insert 208 to be changed as desired. For example, the cavity 206 can include a closed end or an end with a ridge sufficiently large that the second washer 302 is unnecessary.

Figure 6:
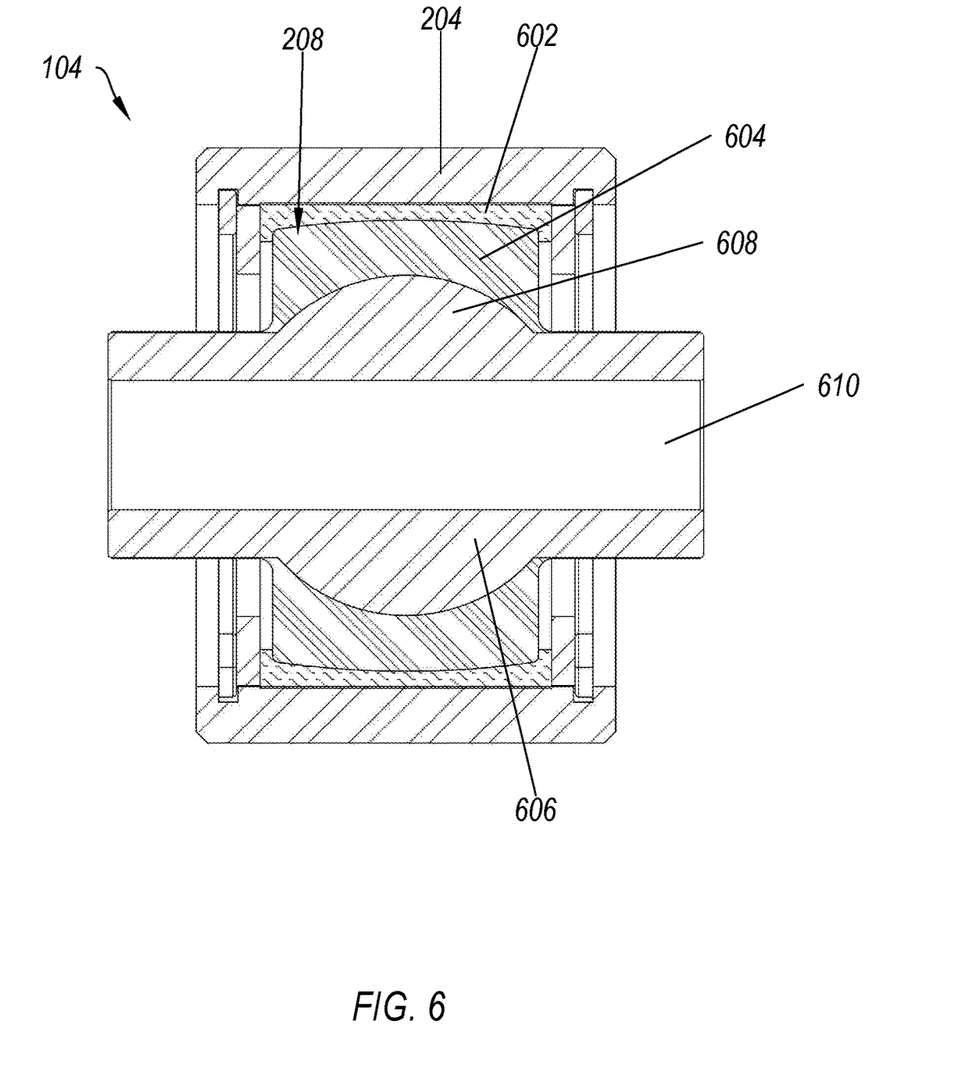
FIG. 6 illustrates a cross-section of a housing and insert.

FIG. 6 illustrates a cross-section of a housing 204 and insert 208. In at least one implementation, the axis of the insert 208 can tilt relative to the axis of the housing 204. I.e., the ends of the insert 208 can move relative to the housing 204. For example, the axis of the insert 208 may be able to tilt up to 17 degrees relative to the axis of the housing 204 without any loss of functionality. Additionally or alternatively, the insert 208 can move laterally within the housing 204. For example, the insert 208 can move vertically as shown in FIG. 6 (also illustrated in FIG. 12) or into and out of the plane of FIG. 6. Additionally or alternatively, the insert 208 may be able to rotate within the housing 204. I.e., the insert 208 can rotate about its axis within the housing 204

FIG. 6 shows that the insert 208 can include an inner elastomer 602. In at least one implementation, the inner elastomer 602 can resist movement of the external device, as described below. For example, the inner elastomer 602 can include rubber, a polymer or any other desired material.

FIG. 6 moreover shows that the insert 208 can include an outer elastomer 604. The outer elastomer 604 is harder than the inner elastomer. I.e., the outer elastomer has a higher durometer. Durometer is one of several measures of the hardness of a material. Hardness is defined as a material's resistance to permanent indentation. Having an outer elastomer 604 that is harder than the inner elastomer 602 can be critical to provide the durability of a harder elastomer but provide the ride of a softer elastomer. That is, having an outer elastomer 604 that is harder than the inner elastomer 602 can be critical to providing the benefits of using only a harder elastomer and the benefits of using only a softer elastomer. The interface between the inner elastomer 602 and the outer elastomer 604 is fused. That is the inner elastomer 602 is permanently attached to the outer elastomer 604 and together they act as a single body.

The outer elastomer 604 is not attached to the housing 204. I.e., the insert 208 is placed within, and interacts with, the housing 204 but is not permanently attached to the housing 204. A lack of permanent attachment can mean that the housing 204 and the insert 208 are in contact with one another, but not affixed to one another. I.e., friction can prevent motion of the insert 208 relative to the housing 204. One of skill in the art will appreciate that the lack of a permanent attachment can be critical to allow a greater degree of movement in the external device without a loss of appropriate resistance. In particular, a permanent attachment prevents rotation within the housing 204 but additionally causes extreme stress on the inner elastomer 602 and outer elastomer 604. In contrast, a lack of a permanent attachment can allow a degree of rotation, as described below.

FIG. 6 also shows that the insert 208 can include an inner sleeve 606. In at least one implementation, the inner sleeve is fused to the inner elastomer 602. I.e., there is a permanent connection, through bonding, casting, adhesive or any other desired attachment method, between the inner sleeve 606 and the inner elastomer 602. The permanent attachment allows the inner elastomer 602 to resist movement of the inner sleeve 606, as described below. In addition, the permanent attachment reduces wear at the interaction between the inner elastomer 602 and the inner sleeve 606.

FIG. 6 additionally shows that the inner sleeve 606 can include a convex portion 608. In at least one implementation, the convex portion 608 can allow the inner sleeve 606 to be attached to the inner elastomer 602. In particular, the convex portion 608 can increase the amount of surface area available for creating a permanent attachment between the inner elastomer 602 to the inner sleeve 606.

FIG. 6 further shows that the inner sleeve 606 can include a channel 610. In at least one implementation, the channel 610 can receive at least a portion of the external device. For example, the channel 610 can receive a bolt, a shaft or another portion of the external device. I.e., the channel 610 can include an attachment mechanism that allows the external device to affix to the channel 610. For example, the channel 610 can be threaded, include flanges or can be any other desired shape for receiving the external device. The channel 610 can pass entirely through the inner sleeve 606 or partially through the inner sleeve 606, as desired.

Figure 7:
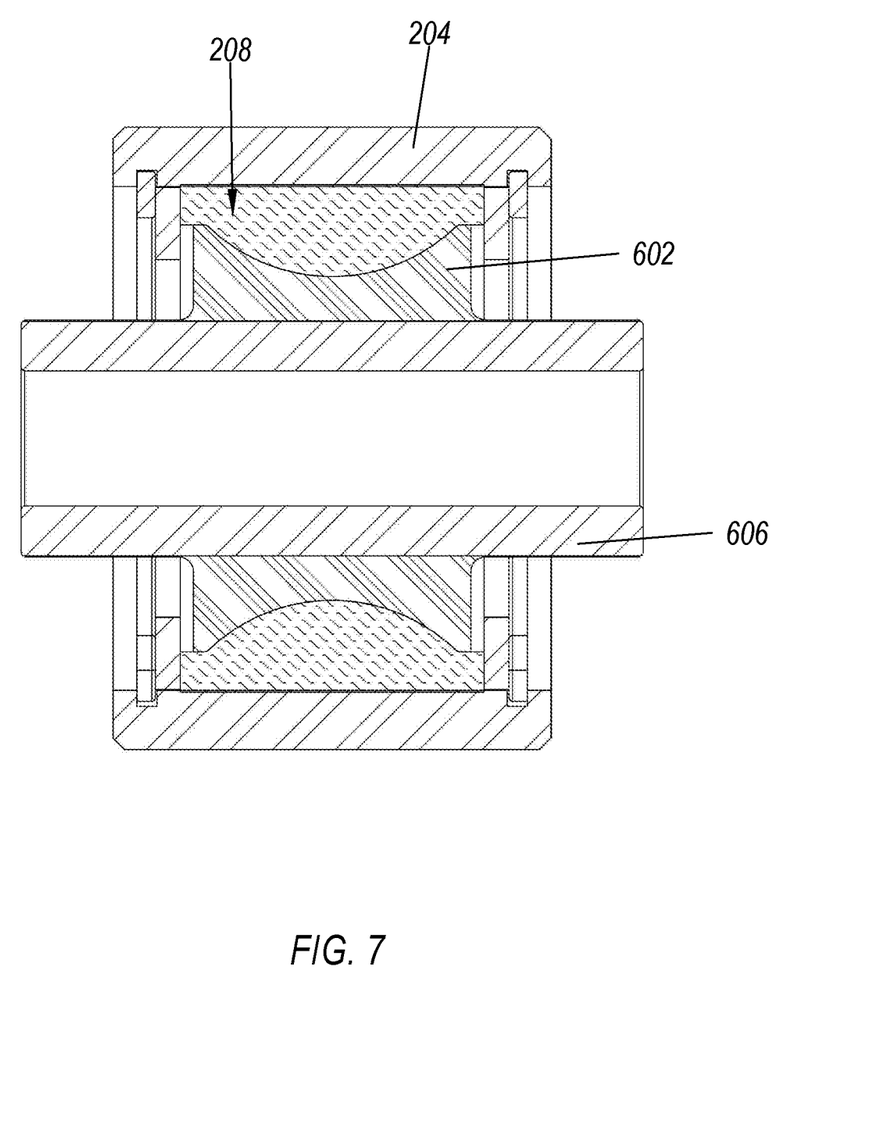
FIG. 7 illustrates a cross-section of a housing and alternative insert.

FIG. 7 illustrates a cross-section of a housing 204 and alternative insert 208. In at least one implementation, the interface between the inner elastomer 602 and the inner sleeve 606 can be smooth within the insert 208. I.e., the inner sleeve 606 is cylindrical in shape. The inner elastomer 602 is permanently attached to the inner sleeve 606 along the entirety of the middle portion of the inner sleeve 606, as described above.

Figure 8:
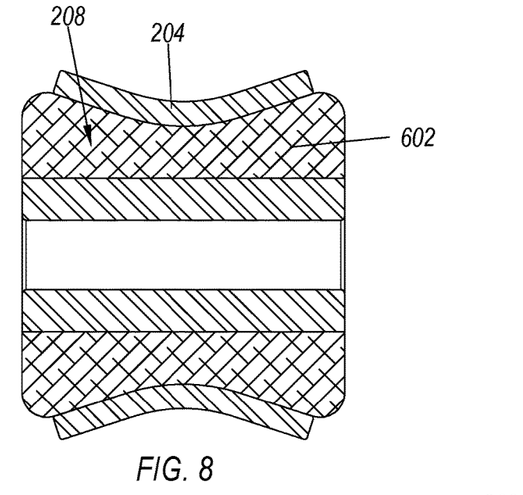
FIG. 8 illustrates a cross-section of an alternative housing and alternative insert.

FIG. 8 illustrates a cross-section of an alternative housing 204 and alternative insert 208. In at least one implementation, the interface between the outer elastomer 604 and housing 204 can be non-linear. I.e., the housing 204 can include a surface which is convex. The outer elastomer 604 can include a surface which is concave and which is configured to mate with the convex surface of the housing 204. The mating of the concave surface of the outer elastomer 604 and the convex surface of the housing 204 can allow for greater interaction between the housing 204 and the outer elastomer 604 even though the outer elastomer 604 is not permanently attached to the housing 204.

Figure 9:
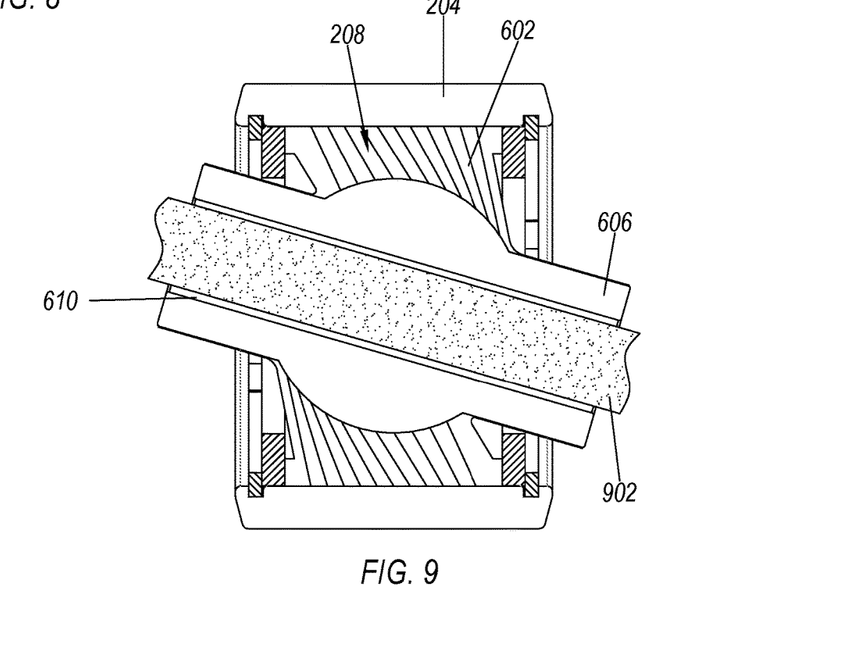
FIG. 9 illustrates a cross-section of an example of a housing and insert which is under torque.

FIG. 9 illustrates a cross-section of an example of a housing 204 and insert 208 which is under torque perpendicular to the axis of the housing 204. In at least one implementation, the torque can cause the inner sleeve 606 to rotate relative to the housing 204 perpendicular to the axis of the housing 204. That is, the axis of the insert 208 is "tilted" relative to the axis of the housing 204.

FIG. 9 shows that an external device 902 has been inserted into the channel 610. In at least one implementation, the external device 902 can pass completely through the channel 610. Additionally or alternatively, the external device 902 can pass through only a portion of the channel 610. For example, the external device 902 can include a screw or bolt which is partially threaded into the channel 610.

FIG. 9 shows that the rotation of the external device 902 has imparted torque onto the inner sleeve 606. Consequently, the inner sleeve 606 has rotated within the housing 204. In particular, the inner sleeve 606 has rotated along an axis perpendicular to the axis of the inner sleeve 606. I.e., one or both ends of the inner sleeve 606 can be moved relative to the center point of the inner sleeve 606. One of skill in the art will appreciate that the inner elastomer 602 and outer elastomer 604 can allow for movement other than rotation of the inner sleeve 606. For example, the inner elastomer 602 and outer elastomer 604 can allow lateral motion perpendicular to the axis of the inner sleeve 606. I.e., the inner elastomer 602 and outer elastomer 604 on one side of the inner sleeve 606 can be compressed while the opposing side of the inner elastomer 602 and outer elastomer 604 expands.

FIG. 9 also shows that the torque is resisted by the inner elastomer 602 and outer elastomer 604. In at least one implementation, the inner elastomer 602 can move where it is permanently attached to the inner sleeve 606 but the outer elastomer 604 has little or no movement where it is in contact with the housing 204. One of skill in the art will appreciate that the difference in movement is force that is stored within the inner elastomer 602 and outer elastomer 604 as potential energy. As the torque on the external device 902 is removed, the force within the inner elastomer 602 and outer elastomer 604 is released, centering the inner sleeve 606 within the inner elastomer 602 and outer elastomer 604.

FIG. 9 further shows that little or no torque is transferred to the housing 204. In at least one implementation, the inner elastomer 602 and outer elastomer 604 absorb the torque rather than transferring the torque to the housing 204. I.e., the inner elastomer 602 and outer elastomer 604 is deformed but the housing 204 is deformation free.

Figure 10:
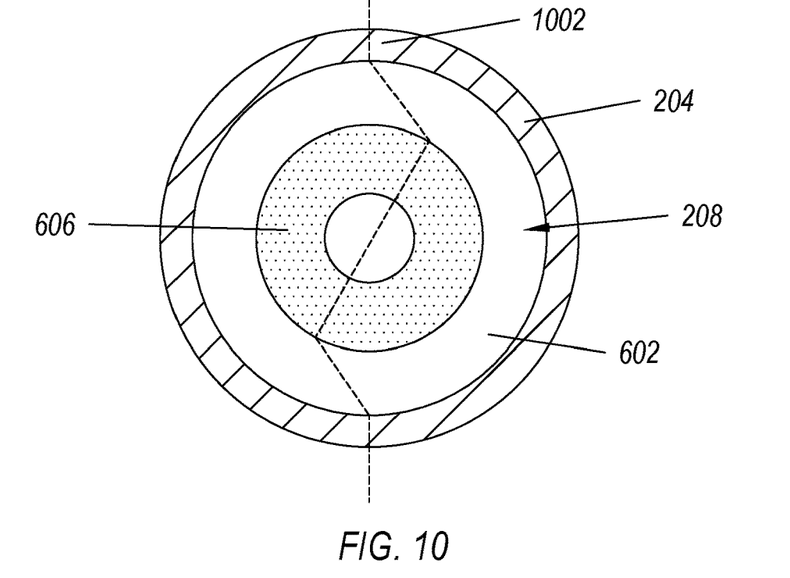
FIG. 10 illustrates a cross-section of an example of a housing and insert which is undergoing micro rotation about the axis of the cavity.

FIG. 10 illustrates a cross-section of an example of a housing 204 and insert 208 which is undergoing micro rotation about the axis of the cavity 206. In at least one implementation, the torque can cause the inner sleeve 606 to rotate relative to the housing 204 without moving the axis of the insert 208. That is, the axis of the insert 208 is not "tilted" relative to the axis of the cavity 206. In particular, the torque can rotate the inner sleeve 606 without imparting the torque to the housing 204, as described below. The reference line 1002 is used to show the relative movements of the components of the joint 114 to one another. Prior to rotation, the reference line 1002 is a vertical line.

FIG. 10 shows that the insert 208 rotates about the axis of the housing 204. In particular, the torque is transmitted by the external device 902 to the inner sleeve 606. The inner sleeve 606 can share an axis with the cavity 206. Thus, the inner sleeve 606 rotates about the axis due to the application of torque. However, because the inner sleeve can rotate, the strain on the inner sleeve 606 is minimized. I.e., the torque results in rotation of the inner sleeve 606, rather than strain within the inner sleeve 606.

FIG. 10 also shows that the inner elastomer 602 and outer elastomer 604 are deformed due to the application of torque. In particular, the permanent attachment between the inner elastomer 602 and the inner sleeve 606 results in movement of the inner elastomer 602 near the inner sleeve in harmony with the movement of the inner sleeve 606. In contrast, near the housing 204 the outer elastomer 604 is theoretically free to move due to the lack of a permanent attachment between the outer elastomer 604 and the housing 204. However, friction prevents movement of the outer elastomer 604 at the junction of the outer elastomer 604 and the housing 204 until the rotation of the inner sleeve 606 becomes sufficient to overcome the friction. Thus, as the inner sleeve 606 rotates, the inner elastomer 602 and outer elastomer 604 become deformed. I.e., the inner elastomer 602 and outer elastomer 604 are under strain due to the rotation of the inner sleeve 606. Such micro rotation (rotation of the inner sleeve 606 which is insufficient to overcome the friction between the outer elastomer 604 and the housing 204) can occur millions of times in the lifetime of the insert 208.

FIG. 10 further shows that the housing 204 has not moved. I.e., the torque is not transmitted or is only minimally transmitted to the housing 204. The energy transmitted by the torquing force has been converted almost entirely to strain within the inner elastomer 602 and outer elastomer 604. Thus, the inner elastomer 602 and outer elastomer 604 provides a resisting force to further rotation of the inner sleeve 606. Likewise, if the torque is removed the inner elastomer 602 and outer elastomer 604 provide a force which rotates the inner sleeve 606 back to its original position.

Figure 11:
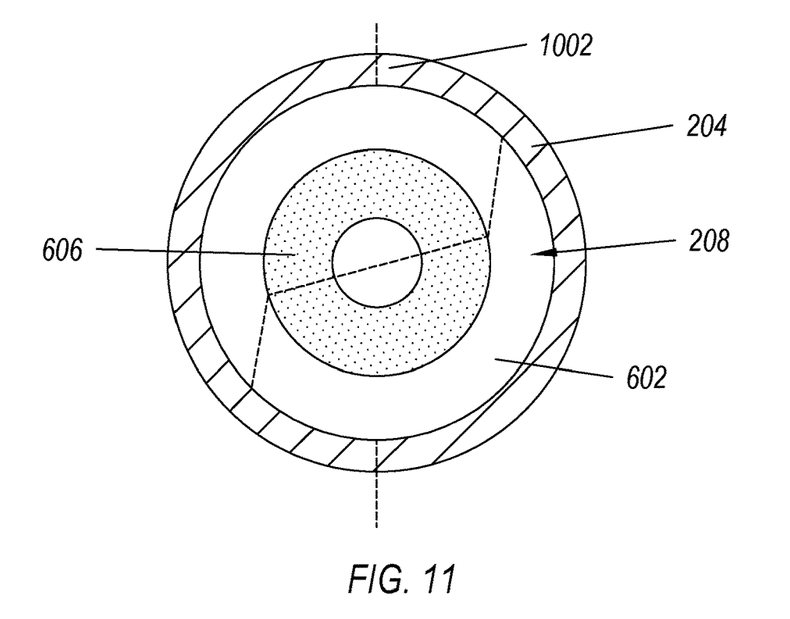
FIG. 11 illustrates a cross-section of the example of a housing and insert which is undergoing macro rotation about the axis of the cavity relative to FIG. 10.

FIG. 11 illustrates a cross-section of the example of a housing 204 and insert 208 which is undergoing macro rotation about the axis of the cavity 206 relative to FIG. 10. That is, FIG. 11 illustrates an example of what happens when the torque of FIG. 10 is increased beyond the ability of friction between the outer elastomer 604 and the housing 204 to prevent movement at the junction between the outer elastomer 604 and the housing 204.

FIG. 11 shows that the outer elastomer 604 has "slipped" relative to the housing 204. The attachment between the outer elastomer 604 and the housing 204 is not permanent, but a product of the friction at the interface between the outer elastomer 604 and housing 204. As the torque on the inner sleeve 606 becomes sufficient to overcome the friction the outer elastomer 604 can rotate relative to the housing 204. This is shown by the "break" in the line 1002 at the interface between the outer elastomer 604 and the housing 204.

Figure 12:
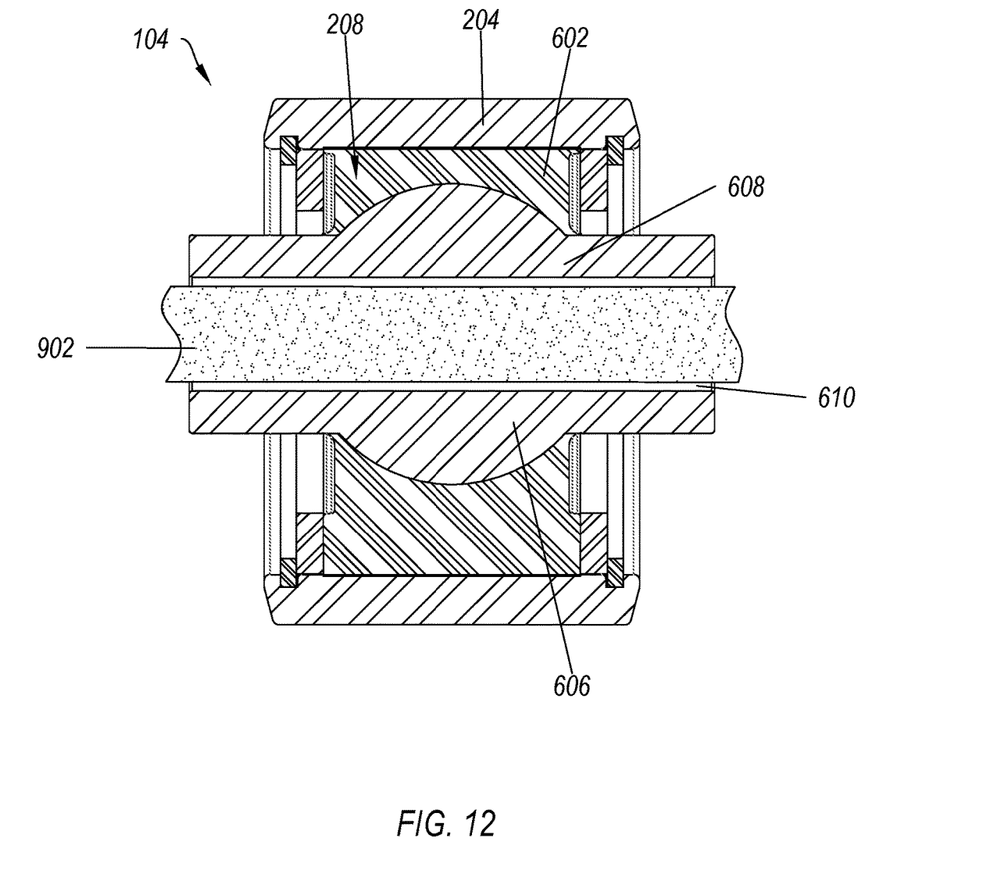
FIG. 12 illustrates a cross-section of an example of a housing and insert which is under lateral force relative to the axis of the housing.

FIG. 12 illustrates a cross-section of an example of a housing 204 and insert 208 which is under lateral force relative to the axis of the housing. In at least one implementation, the force can cause the inner sleeve 606 to move laterally relative to the axis of the housing 204. That is, the external device 902 does not rotate the inner sleeve 606, but rather provides a lateral force in the inner sleeve, "pushing" the inner sleeve 606 into the inner elastomer 602.

FIG. 12 shows that the inner elastomer 602 compresses on one side and expands on the opposing side. That is, as the inner sleeve 606 moves relative to the housing 204 the inner elastomer 602 expands or contracts to dampen the movement. When the lateral movement is sufficient, the lateral motion is transmitted through the inner elastomer 602 to the housing 204. In contrast, when the lateral movement is minor, the lateral movement is dampened by the inner elastomer 602.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A flexible joint for attachment to a suspension link, the flexible joint comprising:
   a housing, wherein the housing includes:
      an external surface; and
      an internal surface; and
   a flexible joint insert, wherein the flexible joint insert includes:
      an inner sleeve, wherein the inner sleeve includes:
         a channel, wherein the channel is configured to receive at least a portion of an external device; and
         an external surface;
      an inner elastomer, wherein the inner elastomer is fused to at least a portion of the external surface of the inner sleeve; and
      an outer elastomer, wherein:
         the outer elastomer is harder than the inner elastomer;
         an interface between the inner elastomer and the outer elastomer is fused;
         a portion of the elastomer is in contact with the internal surface of the housing; and
         the outer elastomer is not permanently attached to the housing; and
      a retaining member, wherein the retaining member is configured to retain the flexible joint insert within the housing.

2. The flexible joint of claim 1, wherein the inner elastomer includes rubber.

3. The flexible joint of claim 1, wherein at least a portion of the external surface of the inner sleeve is convex.

4. The flexible joint of claim 3, wherein at least a portion of the inner elastomer is concave.

5. The flexible joint of claim 4, wherein the concave portion of the inner elastomer covers the convex portion of the external surface of the inner sleeve.

6. The flexible joint of claim 1, wherein the channel includes an attachment mechanism, wherein the attachment mechanism is configured to retain the external device.

7. The flexible joint of claim 6, wherein the attachment mechanism includes:
   flanges.

8. The flexible joint of claim 6, wherein the attachment mechanism includes:
   threads.

9. The flexible joint of claim 1, wherein the channel is configured to tilt up to 17 degrees relative to the housing.

10. The flexible joint of claim 1, wherein the flexible joint insert is configured to rotate within the housing.

11. A suspension link, the suspension link comprising:
    a body;
    a flexible joint, wherein the flexible joint includes:
       a housing, wherein the housing includes:
          an external surface; and
          an internal surface; and
       a flexible joint insert, wherein the flexible joint insert:
          is configured to be inserted in the housing; and
          includes:
             an inner sleeve, wherein the inner sleeve includes:
                a channel, wherein the channel is configured to receive at least a portion of an external device; and
                an external surface, wherein at least a portion of the external surface of the inner sleeve is convex;

an inner elastomer, wherein:
at least a portion of the inner elastomer is concave;
the concave portion of the inner elastomer is permanently attached to the convex portion of the external surface of the inner sleeve; and
an outer elastomer, wherein:
the outer elastomer is harder than the inner elastomer;
an interface between the inner elastomer and the outer elastomer is fused;
a portion of the elastomer is in contact with the internal surface of the housing; and
the elastomer is not permanently attached to the housing; and
a retaining member, wherein the retaining member is configured to retain the flexible joint insert within the housing.

12. The suspension link of claim 11, wherein at least a portion of the housing is convex.

13. The suspension link of claim 12, wherein at least a portion of the outer elastomer is concave.

14. The suspension link of claim 13, wherein the concave portion of the outer elastomer is in contact with the convex portion of the housing.

15. The suspension link of claim 11, wherein the flexible joint includes an attachment.

16. The suspension link of claim 15, wherein the attachment:
is connected to the external surface of the housing; and
is configured to affix the flexible joint to the body.

17. A suspension link, the suspension link comprising:
a body;
a flexible joint, wherein the flexible joint includes:
a housing, wherein the housing includes:
an external surface;
an internal surface; and
an opening; and
an attachment, wherein the attachment:
is connected to the external surface of the housing; and
is configured to affix the flexible joint to the body; and
a flexible joint insert, wherein the flexible joint insert:
is configured to be inserted in the housing; and
includes:
an inner sleeve, wherein the inner sleeve includes:
a channel, wherein the channel is configured to receive at least a portion of an external device; and
an external surface, wherein at least a portion of the external surface of the inner sleeve is convex;
an inner elastomer, wherein:
at least a portion of the inner elastomer is concave;
the concave portion of the inner elastomer is permanently attached to the convex portion of the external surface of the inner sleeve; and
an outer elastomer, wherein:
the outer elastomer is harder than the inner elastomer;
an interface between the inner elastomer and the outer elastomer is fused;
a portion of the outer elastomer is in contact with the internal surface of the housing; and
the outer elastomer is not permanently attached to the housing;
a retaining member, wherein the retaining member is configured to retain the flexible joint insert at the opening of the housing.

18. The suspension link of claim 17, wherein the attachment includes a threaded bolt.

19. The suspension link of claim 17, wherein the suspension link includes at least one of:
a control arm;
a track bar;
a drag link; or
a tie rod.

20. The suspension link of claim 17 further comprising:
a second opening in the housing; and
a second retaining member, wherein the second retaining member is configured to retain the flexible joint insert at the second opening of the housing of the flexible joint.

21. The suspension link of claim 17 further comprising:
a second flexible joint, wherein the second flexible joint includes:
a housing, wherein the housing includes:
an external surface;
an internal surface; and
an opening; and
an attachment, wherein the attachment:
is connected to the external surface of the housing; and
is configured to affix the second flexible joint to the body;
wherein the second flexible joint is affixed to the body opposite the flexible joint; and
a second flexible joint insert, wherein the second flexible joint insert:
is configured to be inserted in the housing of the second flexible joint; and
includes:
an inner sleeve, wherein the inner sleeve includes:
a channel, wherein the channel is configured to receive at least a portion of a second external device; and
an external surface, wherein at least a portion of the external surface of the inner sleeve is convex;
an inner elastomer, wherein:
at least a portion of the inner elastomer is concave;
the concave portion of the inner elastomer is permanently attached to the convex portion of the external surface of the inner sleeve; and
an outer elastomer, wherein:
the outer elastomer is harder than the inner elastomer;
an interface between the inner elastomer and the outer elastomer is fused;
a portion of the outer elastomer is in contact with the internal surface of the housing of the second flexible joint; and
the outer elastomer is not permanently attached to the housing of the second flexible joint;
a second retaining member, wherein the second retaining member is configured to retain the second flexible joint insert at the opening of the housing of the second flexible joint.

* * * * *